United States Patent
Manabe

(10) Patent No.: US 9,262,100 B2
(45) Date of Patent: Feb. 16, 2016

(54) NON-TRANSITORY COMPUTER-READABLE RECORDING MEDIUM STORING DATA CONVERSION PROGRAM, DATA CONVERSION METHOD, AND DATA CONVERSION APPARATUS

(71) Applicant: KYOCERA Document Solutions Inc., Osaka (JP)

(72) Inventor: Hiroshi Manabe, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 48 days.

(21) Appl. No.: 14/170,555

(22) Filed: Jan. 31, 2014

(65) Prior Publication Data

US 2014/0211231 A1    Jul. 31, 2014

(30) Foreign Application Priority Data

Jan. 31, 2013  (JP) .................................. 2013-016689

(51) Int. Cl.
  *G06F 3/12*  (2006.01)
  *H04N 1/00*  (2006.01)
(52) U.S. Cl.
  CPC .............. *G06F 3/1204* (2013.01); *G06F 3/123* (2013.01); *G06F 3/1285* (2013.01); *H04N 1/00344* (2013.01); *H04N 1/00962* (2013.01)
(58) Field of Classification Search
  None
  See application file for complete search history.

(56) References Cited

U.S. PATENT DOCUMENTS

| | | | |
|---|---|---|---|
| 2004/0205620 A1* | 10/2004 | Nishikiori | G06F 17/30905 715/249 |
| 2005/0080755 A1* | 4/2005 | Aoyama | 707/1 |
| 2008/0162629 A1* | 7/2008 | Ashida et al. | 709/203 |
| 2012/0159296 A1* | 6/2012 | Rebstock | G06Q 10/00 715/205 |

FOREIGN PATENT DOCUMENTS

JP    2010-287055 A    12/2010

* cited by examiner

*Primary Examiner* — Fan Zhang
(74) *Attorney, Agent, or Firm* — James W. Judge

(57) ABSTRACT

A non-transitory computer-readable recording medium stores a data conversion program that converts pre-conversion type-format data for a first model of an image forming apparatus into post-conversion type-format data for a second model of the image forming apparatus. The data conversion program causes a computer to function as: i) a common-format conversion unit configured to convert the pre-conversion type-format data into common-format data of format independent of the model based on pre-conversion-data conversion rule information that indicates a rule for converting between the pre-conversion type-format data and the common-format data; and ii) a type-format conversion unit configured to convert the common-format data generated by the common-format conversion unit into the post-conversion type-format data based on post-conversion-data conversion rule information that indicates a rule for converting between the post-conversion type-format data and the common format data.

5 Claims, 12 Drawing Sheets user,password,e-mail_address,access_level, · · · user001,9317,001@xxxxx,2, · · · user002,4035,002@xxxxx,1, · · · user003,4676,003@xxxxx,1, · · ·

FIG. 2

| COLUMN | 1 | 2 | 3 | 4 | |
|---|---|---|---|---|---|
| TYPE-FORMAT ITEM | user | password | e-mail_address | access_level | ... |
| DATA 1 | user001 | 9317 | 001@xxxxx | 2 | ... |
| DATA 2 | user002 | 4035 | 002@xxxxx | 1 | ... |
| DATA 3 | user003 | 4676 | 003@xxxxx | 1 | ... |
| ... | ... | ... | ... | ... | |

FIG. 3

| COLUMN | 1 | 2 | 3 | 4 | ... |
|---|---|---|---|---|---|
| DEFINED VALUE | user | password | access_level | password_mode | ... |
| DATA 1 | user001 | 9317 | 1 | 1 | ... |
| DATA 2 | user002 | 4035 | 0 | 1 | ... |
| DATA 3 | user003 | 4676 | 0 | 1 | ... |
| ... | ... | ... | ... | ... | |

```
<user_list>
    <Data001>
        <UserLogin>user001</UserLogin>
        <UserPassword>9317</UserPassword>
        <PasswordMode></PasswordMode>
        <UserAuthority>0</UserAuthority>
        <EMailAddress>001@xxxxx</EMailAddress>
    </Data001>
    <Data002>
        <UserLogin>user002</UserLogin>
        <UserPassword>4035</UserPassword>
        <PasswordMode></PasswordMode>
        <UserAuthority>1</UserAuthority>
        <EMailAddress>002@xxxxx</EMailAddress>
    </Data002>
    <Data003>
        <UserLogin>user003</UserLogin>
        <UserPassword>4676</UserPassword>
        <PasswordMode></PasswordMode>
        <UserAuthority>1</UserAuthority>
        <EMailAddress>003@xxxxx</EMailAddress>
    </Data003>
        .
        .
        .
</user_list>
```
.
.
.

FIG. 8

```
<UserLogin></UserLogin>
<UserPassword></UserPassword>
<EMailAddress></EMailAddress>
<UserAuthority></UserAuthority>
<PasswordMode></PasswordMode>
        .
        .
        .
```

FIG. 11

NON-TRANSITORY COMPUTER-READABLE RECORDING MEDIUM STORING DATA CONVERSION PROGRAM, DATA CONVERSION METHOD, AND DATA CONVERSION APPARATUS

CROSS-REFERENCE TO RELATED APPLICATION

This application is based upon, and claims the benefit of priority from, corresponding Japanese Patent Application No. 2013-016689 filed in the Japan Patent Office on Jan. 31, 2013, the entire contents of which are incorporated herein by reference.

BACKGROUND

Unless otherwise indicated herein, the description in this section is not prior art to the claims in this application and is not admitted to be prior art by inclusion in this section.

In an image forming apparatus, there is a typical program that converts data in accordance with a change in application version. The typical program converts the data in the image forming apparatus of the same.

To date, various image forming apparatus models have been developed and released. Each model uses type-format data of format depending on the model itself. The type-format data includes individual values as type-format values that each belong to a type-format item. Recently, adding new functions to new models or the like increases the number of type-format items. Accordingly, in the case where a user purchases a new image forming apparatus model and changes the currently-used image forming apparatus to the new one, the user places importance that the type-format data for the currently-used image forming apparatus can be easily converted into type-format data for the new image forming apparatus.

SUMMARY

The present disclosure provides a non-transitory computer-readable recording medium storing a data conversion program that converts pre-conversion type-format data for a first model of an image forming apparatus into post-conversion type-format data for a second model of the image forming apparatus. The data conversion program causes a computer to function as: i) a common-format conversion unit configured to convert the pre-conversion type-format data into common-format data of format independent of the model based on pre-conversion-data conversion rule information that indicates a rule for converting between the pre-conversion type-format data and the common-format data; and ii) a type-format conversion unit configured to convert the common-format data generated by the common-format conversion unit into the post-conversion type-format data based on post-conversion-data conversion rule information that indicates a rule for converting between the post-conversion type-format data and the common format data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

In the accompanying drawings:

FIG. 2 is a schematic diagram illustrating exemplary type-format data for currently-used MFP among the two MFPs.

FIG. 3 is a schematic diagram illustrating the type-format data in FIG. 2 that is represented in table format.

FIG. 4 is a schematic diagram illustrating the exemplary type-format data that is represented in the table format for new MFP among the two MFPs.

FIG. 8 is a schematic diagram of the exemplary common-format data generated by the data conversion apparatus.

FIG. 11 is a schematic diagram illustrating exemplary common-format null data used by the data conversion apparatus.

DETAILED DESCRIPTION

Figure 1:
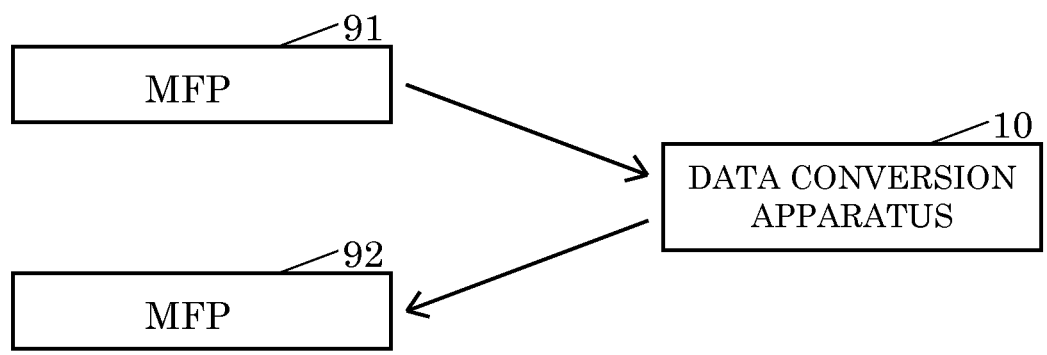
FIG. 1 is a schematic diagram illustrating a relationship between a data conversion apparatus and multifunction peripherals (MFPs) according to one embodiment of the present disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the disclosure, as generally described herein, and illustrated in the drawings, can be arranged, substituted, combined, separated, and designed in a wide variety of different configurations, all of which are explicitly contemplated herein.

The following describes one embodiment of this disclosure using the drawings.

First, a configuration of a data conversion apparatus 10 according to the embodiment will be described.

FIG. 1 is a schematic diagram illustrating the relationship between the data conversion apparatus 10, and an MFP 91 and an MFP 92.

As illustrated in FIG. 1, the data conversion apparatus 10 is an apparatus that converts currently used type-format data for a multifunction peripheral (MFP) 91 into type-format data for new MFP 92 when a user of the MFP 91 as an image forming apparatus purchases a new image forming apparatus, the MFP 92, and changes the model from the MFP 91 to the MFP 92. The data conversion apparatus 10 is used by a serviceman, for example.

MFP 91 and MFP 92 each store an address book, a user list, a department list, and apparatus setting information. The address book includes various addresses, such as a FAX address and an e-mail address, for each of user or department. The user list includes various information on a user, such as a user name and a user password. The department list includes various information on a department, such as a department name and a department password. The apparatus setting information includes various setting information on the MFP itself, such as a sleep mode setting. The MFP 91 and the MFP 92 each have an export function and an import function. The export function exports various information registered with the MFP itself, such as the address book, the user list, the department list, and the apparatus setting information, as type-format data. The import function imports the type-format data as various information, such as the address book, the user list, the department list, and the apparatus setting information, registered with the MFP itself. The MFP 91 and the MFP 92 send the type-format data exported to the outside and reads the type-format data imported from the outside via, for example, a Universal Serial Bus (USB) memory.

FIG. 2 is a schematic diagram of exemplary type-format data for the MFP 91.

The type-format data is binary data uniquely processed by, for example, compressing Comma-Separated Values (CSV) format data and adding various information to the compressed CSV format data. The various information includes information on the MFP model compatible with the type-format data (hereinafter referred to as "model information") and information on a type of contents in the type-format data, such as the address book, the user list, the department list, and the apparatus setting information (hereinafter referred to as "data type information"). The type-format data can be referred to and edited only by use of a data conversion program 14a (see FIG. 5), which will be described later. The type-format data for the MFP 91 can be converted into CSV format data as illustrated in FIG. 2. The type-format data illustrated in FIG. 2 corresponds to the user list. As illustrated in FIG. 2, the first line of the type-format data arrays type-format items to which type-format values, individual values in the type-format data, belong. Each line of the second line or later of the type-format data is a line corresponding to individual data in the type-format data. Each line of the second line or later of the type-format data is a line where type-format values are arrayed. That is, the type-format data is data where the type-format items are expressed in accordance with the order in a series of the type-format values.

FIG. 3 is a schematic diagram illustrating the type-format data illustrated in FIG. 2 that is represented in table format.

When the type-format data illustrated in FIG. 2 is expressed in table format for ease of understanding, the type-format data is as illustrated in FIG. 3. In the type-format data illustrated in FIG. 3, the access level (access_level) "2" denotes a general user and the access level "1" denotes an administrator.

FIG. 4 is a schematic diagram illustrating exemplary type-format data for the MFP 92 that is represented in table format.

In the type-format data illustrated in FIG. 4, the access level (access_level) "1" denotes a general user and the access level "0" denotes an administrator. Different from the type-format data illustrated in FIG. 3, the type-format data illustrated in FIG. 4 does not include a type-format item referred to as an e-mail address (e-mail_address). Different from the type-format data illustrated in FIG. 3, the type-format data illustrated in FIG. 4 includes a type-format item referred to as a password mode (password_mode).

Figure 5:
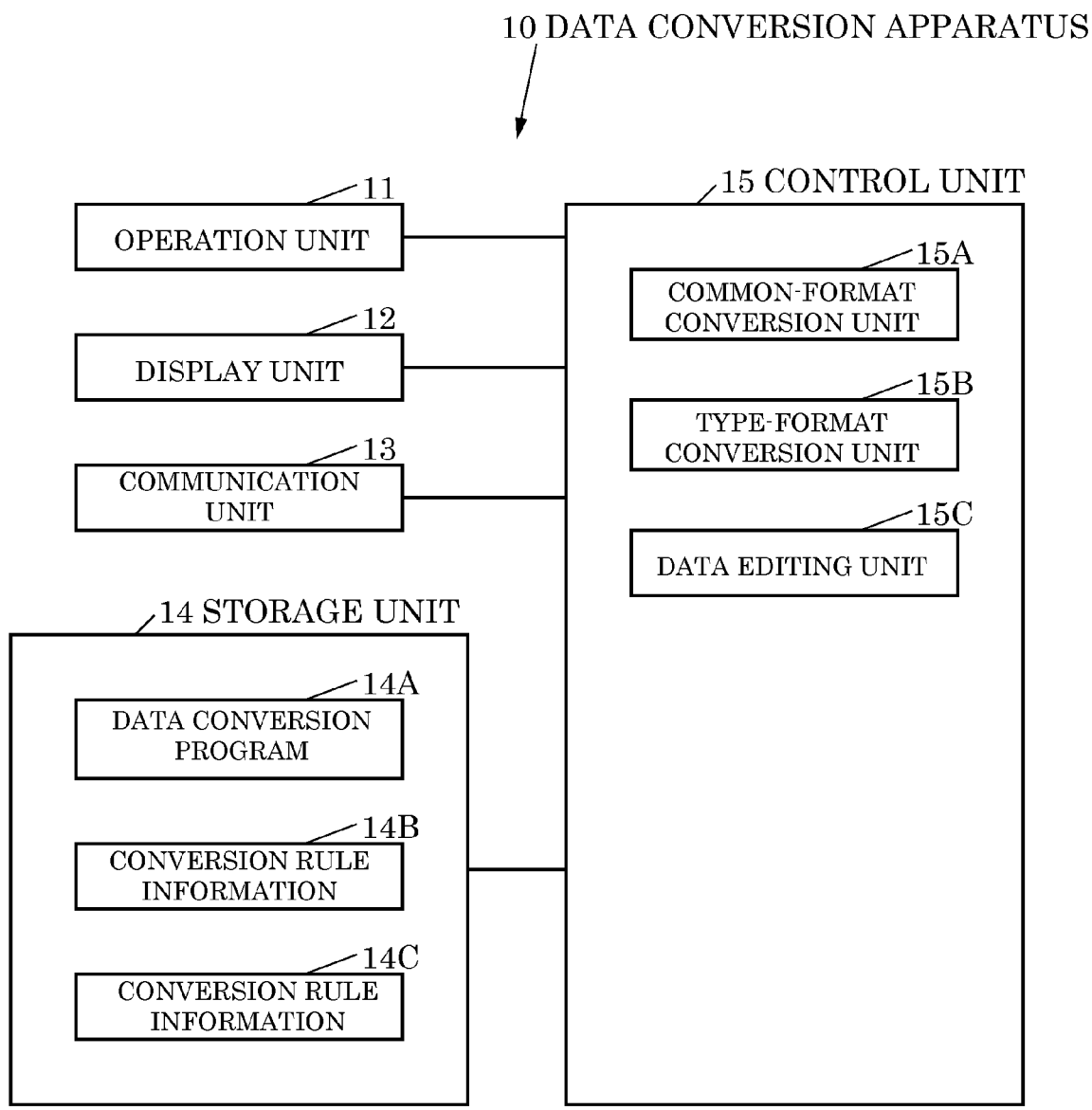
FIG. 5 is a block diagram illustrating a configuration of the data conversion apparatus.

FIG. 5 is a block diagram illustrating the configuration of the data conversion apparatus 10.

As illustrated in FIG. 5, the data conversion apparatus 10 includes a operation unit 11, a display unit 12, a communication unit 13, a storage unit 14, and a control unit 15. The operation unit 11 is an input device, such as a computer mouse and a keyboard, to which various operations are input by the user. The display unit 12 is a display device, such as a Liquid Crystal Display (LCD), that displays various information. The communication unit 13 is a communication device for communications with an external device. The storage unit 14 is a non-volatile storage device, such as a Hard Disk Drive (HDD), that stores various data. The control unit 15 controls the entire data conversion apparatus 10. The data conversion apparatus 10 is configured by, for example, a computer such as a Personal Computer (PC).

The storage unit 14 stores the data conversion program 14a executed by the data conversion apparatus 10. The data conversion program 14a is type-format data of format dependent on the MFP model. The data conversion program 14a converts pre-conversion type-format data, which is for a given model, into post-conversion type-format data, which is type-format data for a model different from the model. The data conversion program 14a may be installed on the data conversion apparatus 10 at a production stage of the data conversion apparatus 10, may be additionally installed on the data conversion apparatus 10 from a storage medium such as a Compact Disk (CD), a Digital Versatile Disk (DVD), and a USB flash drive, or may be additionally installed on the data conversion apparatus 10 via a network.

The storage unit 14 stores conversion rule information 14b and conversion rule information 14c. The conversion rule information 14b is the conversion rule information showing a rule for converting the type-format data and the common-format data of format independent of MFP model. The conversion rule information 14b is stored as pre-conversion-data conversion rule information, which is conversion rule information for the pre-conversion type-format data. The conversion rule information 14c is stored as post-conversion-data conversion rule information, which is conversion rule information for the post-conversion type-format data.

Figure 6:
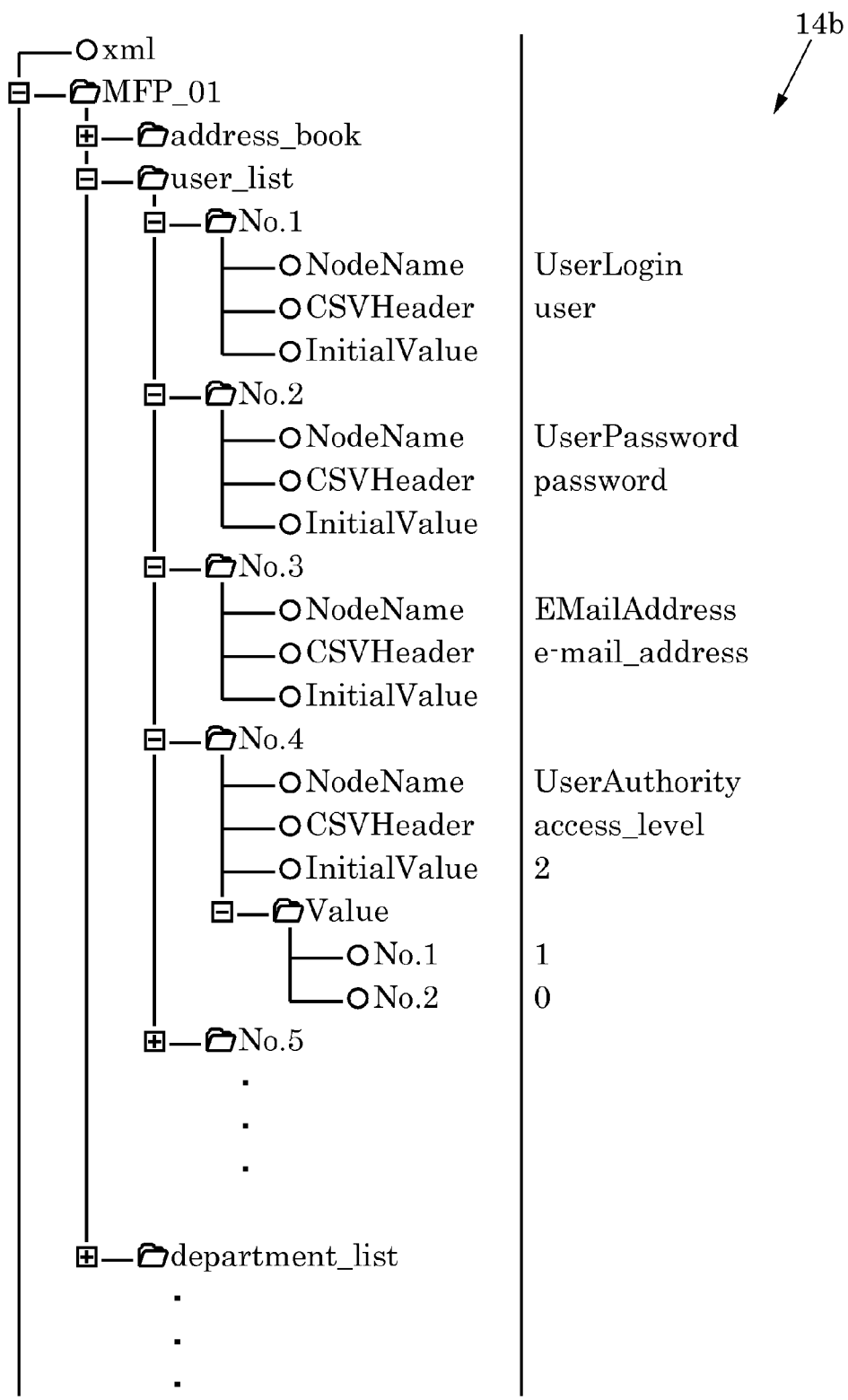
FIG. 6 is a schematic diagram illustrating one conversion rule information among the two conversion rule information in FIG. 5.
Figure 7:
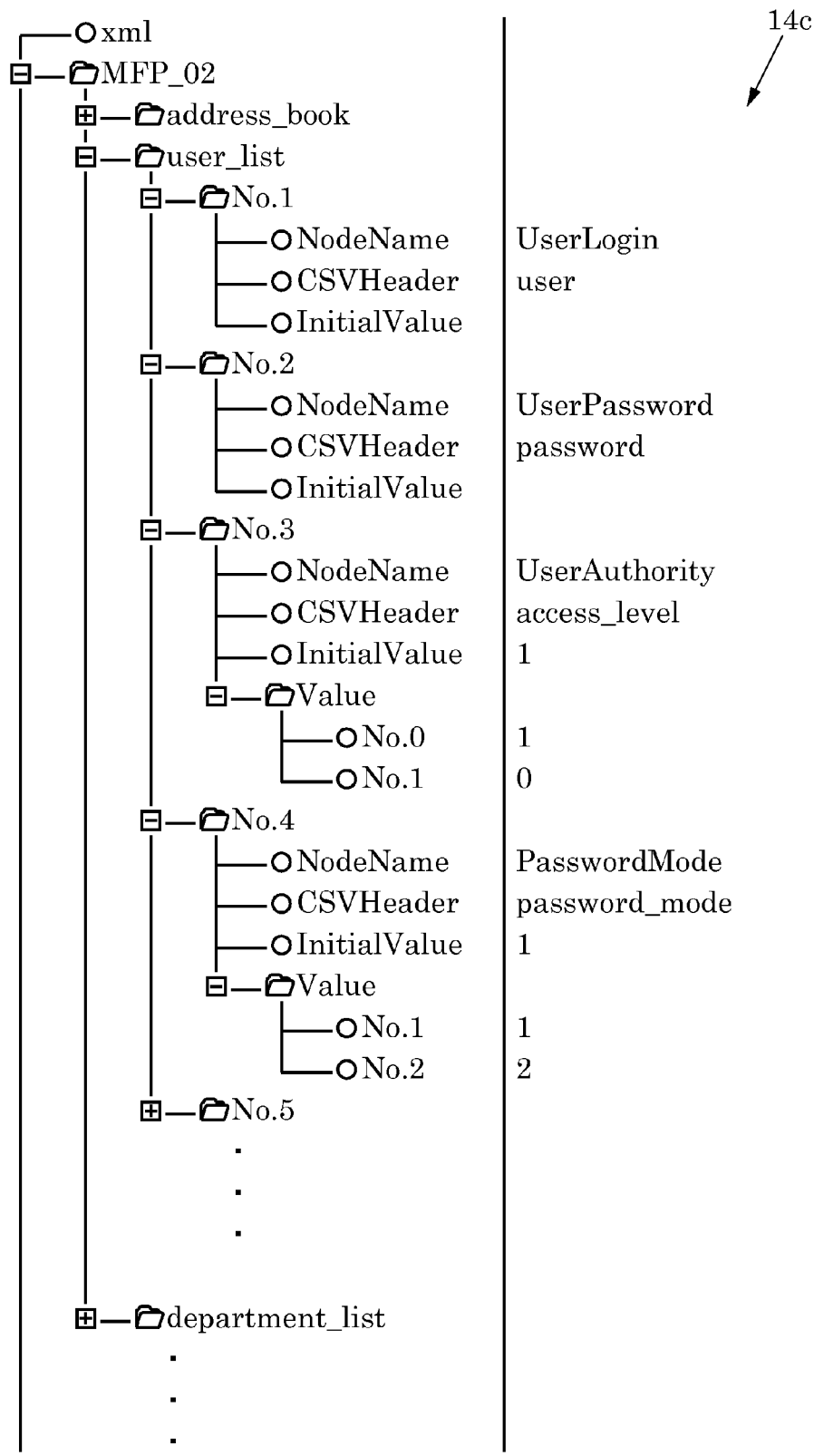
FIG. 7 is a schematic diagram illustrating the other conversion rule information among the two conversion rule information in FIG. 5.

FIG. 6 is a schematic diagram illustrating the conversion rule information 14b. FIG. 7 is a schematic diagram illustrating the conversion rule information 14c.

As illustrated in FIG. 6 and FIG. 7, the conversion rule information 14b and the conversion rule information 14c are Extensible Markup Language (XML) definition files.

FIG. 8 is a schematic diagram illustrating exemplary common-format data generated by the data conversion apparatus 10.

The common-format data illustrated in FIG. 8 is an XML file. The common-format data illustrated in FIG. 8 includes common-format values (for example, "user001" and "9317") and common-format items (for example, "UserLogin" and "UserPassword") related with one another in the common-format data. The common-format value is an individual value in the common-format data. The common-format item is an item to which the common-format value belongs. Here, the common-format items are expressed as an element of each tag, for example, "UserLogin," "UserPassword," "EMailAddress," "UserAuthority," and "PasswordMode." The common-format value is expressed as a content sandwiched between a start tag and an end tag.

The control unit 15 illustrated in FIG. 5 includes, for example, a Central Processing Unit (CPU), a Read Only Memory (ROM), which preliminary stores a program and various data, and a Random Access Memory (RAM), which is employed as a work area for the CPU. The CPU runs a program stored in the ROM or the storage unit 14.

The control unit 15 functions as a common-format conversion unit 15a, a type-format conversion unit 15b, and a data editing unit 15c. The common-format conversion unit 15a converts pre-conversion type-format data into common-format data based on the conversion rule information 14b on the storage unit 14 by running the data conversion program 14a stored in the storage unit 14. The type-format conversion unit 15b converts the common-format data generated by the common-format conversion unit 15a into the post-conversion type-format data based on the conversion rule information 14c on the storage unit 14. The data editing unit 15c edits the common-format data generated by the common-format conversion unit 15a.

Next, operations of the data conversion apparatus 10 will be described.

Figure 9:
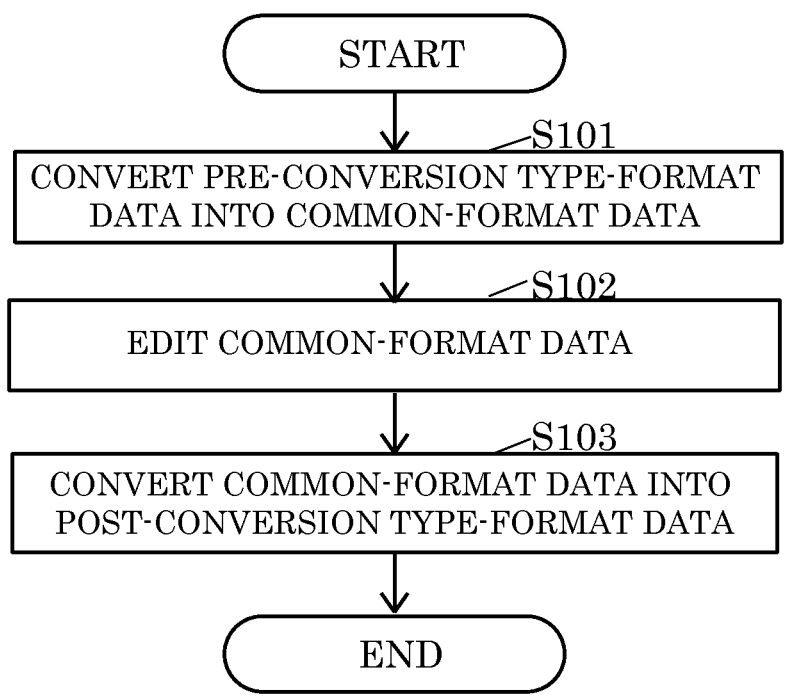
FIG. 9 is a flowchart illustrating operations of the data conversion apparatus.

FIG. 9 is a flowchart illustrating the operations of the data conversion apparatus 10.

As illustrated in FIG. 9, when the common-format conversion unit 15a of the control unit 15 of the data conversion apparatus 10 is instructed to convert the pre-conversion type-format data, which is the type-format data to which information such as the address book, the user list, the department list, and the apparatus setting information of the MFP 91, is exported by the MFP 91, into the common-format data via the operation unit 11, the common-format conversion unit 15a converts the pre-conversion type-format data input to the data conversion apparatus 10 via, for example, the USB flash drive into the common-format data based on the conversion rule information 14b (S101).

Figure 10:
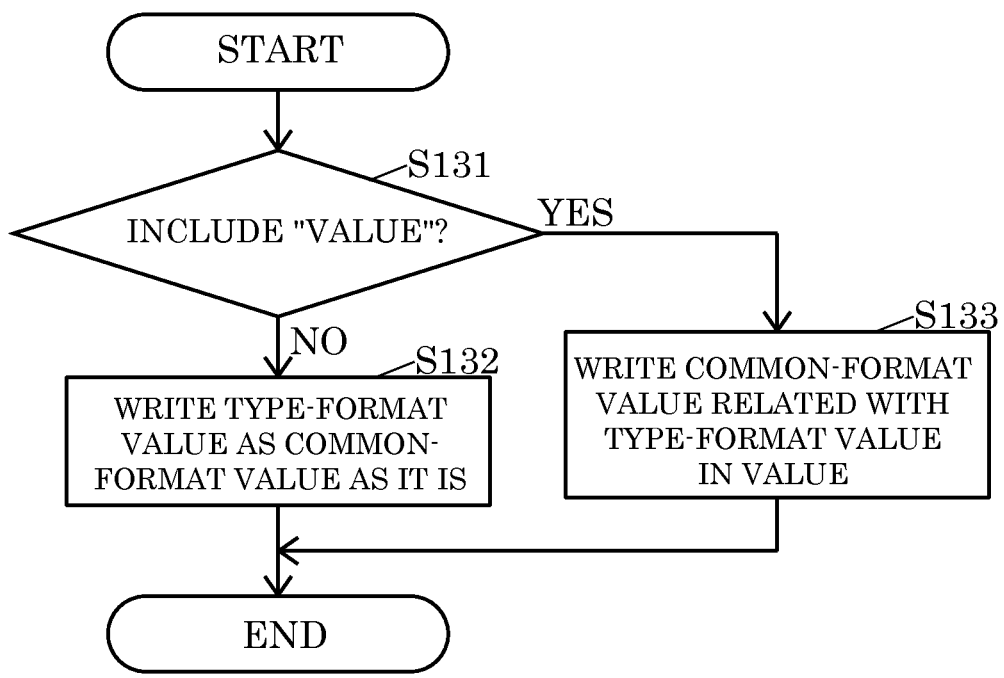
FIG. 10 is a flowchart illustrating operations of a common-format conversion unit in FIG. 5 for writing a common-format value.

The common-format conversion unit 15a performs a process shown in FIG. 10 when writing a common-format value.

FIG. 10 is a flowchart illustrating the operations of the common-format conversion unit 15a for writing a common-format value.

As illustrated in FIG. 10, the common-format conversion unit 15a determines whether "Value" is included in the applied rule or not (S131). Here, "Value" is a rule for correlation of the type-format value with the common-format value.

If the common-format conversion unit 15a determines that "Value" is not included in the applied rule at S131, the common-format conversion unit 15a writes the type-format value as the common-format value (S132) as it is and ends the operation shown in FIG. 10.

On the other hand, if the common-format conversion unit 15a determines that "Value" is included in the applied rule at S131, the common-format conversion unit 15a writes the common-format value related with the type-format value in "Value" (S133) and ends the operation shown in FIG. 10.

The following describes a case where the type-format data illustrated in FIG. 3, namely, the pre-conversion type-format data is converted into the common-format data using an example of user list.

The common-format conversion unit 15a reads the conversion rule information 14b corresponding to the model information in the pre-conversion type-format data, "MFP_01," from the storage unit 14. Then, the common-format conversion unit 15a generates the common-format data illustrated in FIG. 8 based on the rule corresponding to the data type information in the pre-conversion type-format data, "user_list," among the conversion rule information 14b illustrated in FIG. 6. Specifically, the common-format conversion unit 15a applies the rule corresponding to the column number of the type-format value among the rules corresponding to "user_list" in the conversion rule information 14b to the type-format value in the pre-conversion type-format data so as to generate the common-format data.

First, the common-format conversion unit 15a generates a start tag and an end tag with element name of "Data001" corresponding to "data 1" of the pre-conversion type-format data. The common-format conversion unit 15a writes the common-format null data, which is common-format data with null value illustrated in FIG. 11, to the area sandwiched between the start tag and the end tag.

Next, the common-format conversion unit 15a writes "user001" to "UserLogin" in the common-format null data between the start tag and the end tag with the element name of "Data001" as a common-format value related in the common-format null data (S132). "user001" is a type-format value of the column number "1" in "data 1" in the pre-conversion type-format data. "UserLogin" is the common-format item (NodeName) for "No. 1" related with the column number "1" in the conversion rule information 14b.

Next, the common-format conversion unit 15a writes "9317" to "UserPassword" in the common-format null data between the start tag and the end tag with the element name of "Data001" as a common-format value related in the common-format null data (S132). "9317" is a type-format value of the column number "2" in "data 1" in the pre-conversion type-format data. "UserPassword" is the common-format item (NodeName) for "No. 2" related with the column number "2" in the conversion rule information 14b.

Next, the common-format conversion unit 15a writes "001@xxxxx" to "EMailAddress" in the common-format null data between the start tag and the end tag with the element name of "Data001" as a common-format value related in the common-format null data (S132). "001@xxxxx" is a type-format value of the column number "3" in "data 1" in the pre-conversion type-format data. "EMailAddress" is the common-format item (NodeName) for "No. 3" related with the column number "3" in the conversion rule information 14b.

Next, since "Value" is included in the rule of "No. 4" related with the column number "4" in the conversion rule information 14b (YES at S131), the common-format conversion unit 15a writes "0" to "UserAuthority" in the common-format null data between the start tag and the end tag with the element name of "Data001" as a common-format value related in the common-format null data (S133). "0" is a common-format value where "2," the type-format value of the column number "4" in "data 1" in the pre-conversion type-format data, is related as "No. 2" in "Value." "UserAuthority" is the common-format item (NodeName) for "No. 4" related with the column number "4" in the conversion rule information 14b.

Next, the common-format conversion unit 15a also reflects the type-format values of the column number "5" or later in "data 1" in the pre-conversion type-format data to the common-format data, similarly to the type-format values of the column number up to "4 in "data 1" in the pre-conversion type-format data.

Next, the common-format conversion unit 15a also reflects each type-format value in "data 2" in the pre-conversion type-format data to the common-format data, similarly to the information in "data1." Here, since "Value," which is the rule for correlating the type-format value and the common-format value, is included in the rule of "No. 4" related with the column number "4" in the conversion rule information 14b (YES at S131), the common-format conversion unit 15a writes "1" to "UserAuthority" in the common-format null data between the start tag and the end tag with the element name of "Data002" as a common-format value related in the common-format null data (S133). "1" is a common-format value where the type-format value of the column number "4" in "data 2" in the pre-conversion type-format data is related as "No. 1" in "Value." "UserAuthority" is the common-format item (NodeName) for "No. 4" related with the column number "4" in the conversion rule information 14b.

Next, the common-format conversion unit 15a also reflects each type-format value in "data 3" or later in the pre-conversion type-format data to the common-format data, similarly to the information in "data 1" or "data 2" in the pre-conversion type-format data.

As illustrated in FIG. 9, the data editing unit 15c of the control unit 15 of the data conversion apparatus 10 displays the common-format data generated at S101 on the display unit 12 and edits the common-format data in accordance with an instruction via the operation unit 11 (S102). The process in S102 can be omitted.

Next, assume that the type-format conversion unit 15b of the control unit 15 of the data conversion apparatus 10 is instructed to convert the common-format data into the post-conversion type-format data via the operation unit 11. Then, in the case where the common-format data is not edited by the data editing unit 15c at S102, the common-format data generated by the common-format conversion unit 15a is converted into the post-conversion type-format data based on the conversion rule information 14c on the storage unit 14 (S103) and ends the process illustrated in FIG. 9. In the case where the common-format data is edited by the data editing unit 15c at S102, the common-format data edited by the data editing unit 15c is converted into the post-conversion type-format data based on the conversion rule information 14c on the storage unit 14 (S103) and ends the process shown in FIG. 9.

Figure 12:
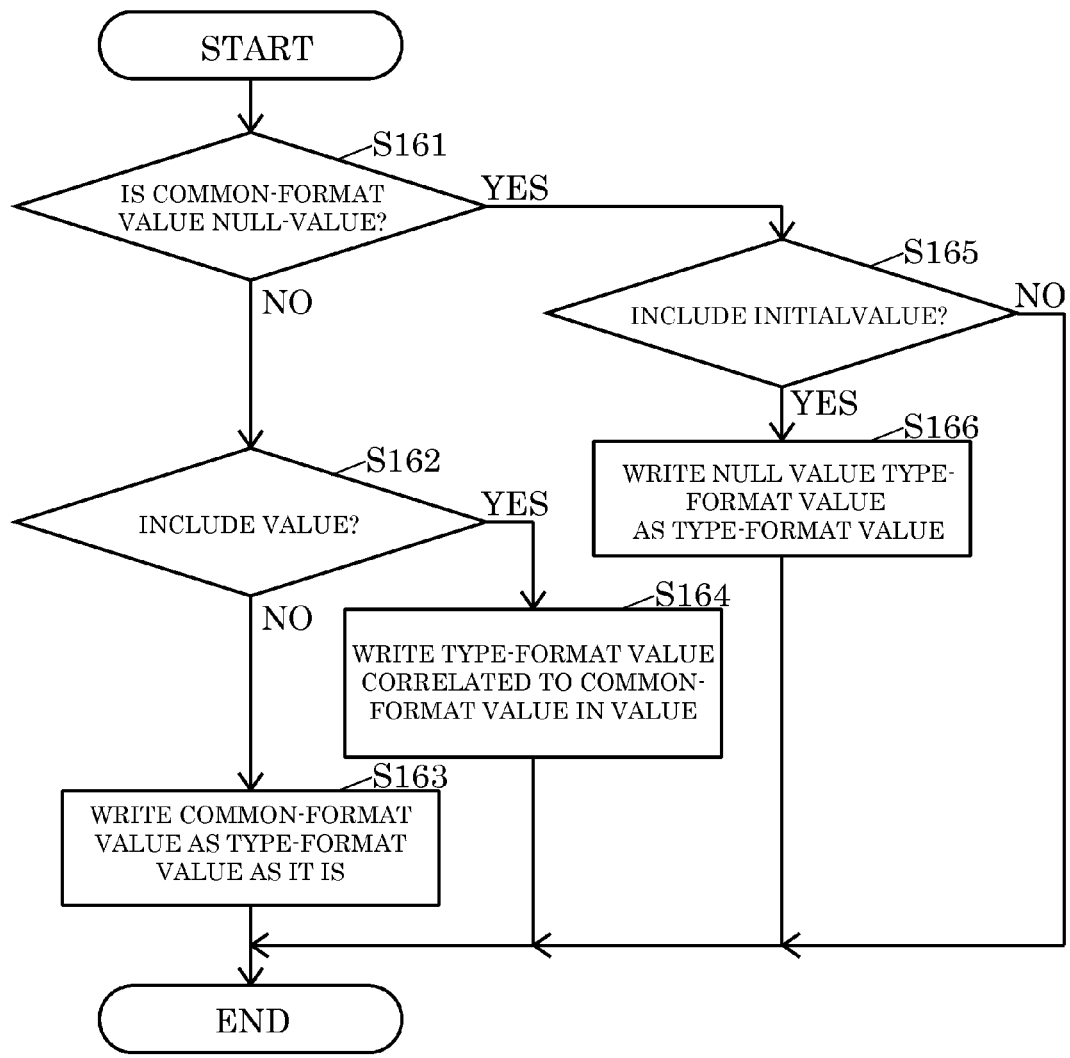
FIG. 12 is a flowchart illustrating operations of a type-format conversion unit illustrated in FIG. 5 for writing a type-format value.

When writing the type-format value, the type-format conversion unit 15b performs the processes shown in FIG. 12.

FIG. 12 is a flowchart illustrating the operations of the type-format conversion unit 15b for writing a type-format value.

As shown in FIG. 12, the type-format conversion unit 15b determines whether the common-format value is a null value or not (S161).

When the type-format conversion unit 15b determines that the common-format value is not a null value at S161, the type-format conversion unit 15b determines whether "Value" is included in the applied rule or not (S162).

If the type-format conversion unit 15b determines that "Value" is not included in the applied rule at S162, the type-format conversion unit 15b writes the common-format value as the type-format value (S163) as it is and ends the operation shown in FIG. 12.

On the other hand, if the type-format conversion unit 15b determines that the applied rule does not include "Value" at S162, the type-format conversion unit 15b writes the type-format value related with the common-format value in "Value" (S164) and ends the operation shown in FIG. 12

If the type-format conversion unit 15b determines that the common-format value is a null value at S161, the type-format conversion unit 15b determines whether "InitialValue" is included in the applied rule or not (S165).

When the type-format conversion unit 15b determines that the applied rule includes "InitialValue" at S165, the type-format conversion unit 15b writes a null value type-format value, which is set related with "InitialValue" as a type-format value in the case where the common-format value is a null value, as the type-format value (S166) and ends the operation shown in FIG. 12.

If the type-format conversion unit 15b determines that "InitialValue" is not included in the applied rule at S165, the type-format conversion unit 15b does not write anything and ends the operation shown in FIG. 12.

The following describes a case where the common-format data illustrated in FIG. 8 is converted into the post-conversion type-format data using an example of user list.

The type-format conversion unit 15b reads the conversion rule information 14c corresponding to "MFP_02," which is the model information of the MFP 92 specified by the user via the operation unit 11, from the storage unit 14. Then, the type-format conversion unit 15b generates the post-conversion type-format data, namely, the type-format data illustrated in FIG. 4 based on the rule corresponding to "user_list," which is the data type information in the common-format data, among the conversion rule information 14c illustrated in FIG. 7. Specifically, the type-format conversion unit 15b applies the rule corresponding to the element name surrounding the common-format value among the rules corresponding to "user_list" in the conversion rule information 14c to the common-format value in the common-format data so as to generate the post-conversion type-format data.

First, the type-format conversion unit 15b creates a CSV format file (hereinafter referred to as a "CSV file") for post-conversion type-format data. The type-format conversion unit 15b writes "user," which is the type-format item (CSVHeader) related with "No. 1" in the rule corresponding to "user_list" in the conversion rule information 14c, to the CSV file.

Next, the type-format conversion unit 15b additionally writes commas to the CSV file. Then, the type-format conversion unit 15b additionally writes "password," which is the type-format item (CSVHeader) related with "No. 2" in the rule corresponding to "user_list" in the conversion rule information 14c, to the CSV file.

Next, the type-format conversion unit 15b additionally writes commas to the CSV file. Then, the type-format conversion unit 15b additionally writes "access_level," which is the type-format item (CSVHeader) related with "No. 3" in the rule corresponding to "user_list" in the conversion rule information 14c, to the CSV file.

Next, the type-format conversion unit 15b additionally writes commas to the CSV file. Then, the type-format conversion unit 15b additionally writes "password_mode," which is the type-format item (CSVHeader) related with "No. 4" in the rule corresponding to "user_list" in the conversion rule information 14c, to the CSV file.

Next, the type-format conversion unit 15b also additionally writes type-format items (CSVHeader) related with "No. 5" or later in the rule corresponding to "user_list" in the conversion rule information 14c, to the CSV file, similarly to the type-format items (CSVHeader) related with up to "No. 4" in the rule corresponding to "user_list" in the conversion rule information 14c, to the CSV file.

Next, the type-format conversion unit 15b additionally writes a line break to the CSV file. Then, the type-format conversion unit 15b additionally writes "user001," which is the common-format value related between the start tag and the end tag with the element name of "Data001" in the common-format data, to "UserLogin," which is the common-format item (NodeName) of "No. 1" in the rule corresponding to "user_list" in the conversion rule information 14c, to the CSV file (S163).

Next, the type-format conversion unit 15b additionally writes commas to the CSV file. Then, the type-format conversion unit 15b additionally writes "9317," which is the common-format value related between the start tag and the end tag with the element name of "Data001" in the common-format data, to "UserPassword," which is the common-format item (NodeName) of "No. 2" in the rule corresponding to "user_list" in the conversion rule information 14c, to the CSV file (S163).

Next, since "Value," which is the rule for correlating the type-format value with the common-format value, is included in the rule of "No. 3" related with "user_list" in the conversion rule information 14c (YES at S162), the type-format conversion unit 15b additionally writes commas to the CSV file. Then, the type-format conversion unit 15b additionally writes "1," which is the type-format value related as "No. 1" in "Value," to "0, which is the common-format value related between the start tag and the end tag with the element name of "Data001" in the common-format data to "UserAuthority," which is the common-format item (NodeName) of "No. 3" in the rule corresponding to "user_list" in the conversion rule information 14c, to the CSV file (S164).

In the rule corresponding to "user_list" in the conversion rule information 14c, the common-format value related with "PasswordMode," which is the common-format item (Node-Name) of "No. 4," between the start tag and the end tag with the element name of "Data001" in the common-format data is a null value (YES at S161). Accordingly, the type-format conversion unit 15b additionally writes commas to the CSV file, and then the type-format conversion unit 15b additionally writes not the null value but "1," which is related with "PasswordMode" as "InitialValue" in the conversion rule information 14c, to the CSV file (S166). Here, "1" related with "InitialValue" is a null value type-format value of this disclosure set as a type-format value when the common-format value in the common-format data is a null value.

Next, the type-format conversion unit 15b also additionally writes each common-format value, which is related between the start tag and the end tag with the element name of "Data001 in the common-format data, to the common-format item (NodeName) of "No. 5" or later in the rules corresponding to "user_list" in the conversion rule information 14c to the CSV file. This writing is performed similarly to the common-format value, which is related between the start tag and the end tag with the element name of "Data001" in the common-format data, to the common-format items (NodeName) of up to "No. 4" in the rules corresponding to "user_list" in the conversion rule information 14c.

Next, the type-format conversion unit 15b also additionally writes each common-format value, which is related between the start tag and the end tag with the element name of "Data002" in the common-format data, to the CSV file, similarly to the common-format value, which is related between the start tag and the end tag with the element name of "Data001" in the common-format data.

Finally, the type-format conversion unit 15b compresses the CSV file. The type-format conversion unit 15b generates the post-conversion type-format data by, for example, adding various information including "MFP 02," which is device information in the conversion rule information 14c, and "user_list," which is data type information, to the compressed CSV file.

The post-conversion type-format data generated by the type-format conversion unit 15b at S103 is input from the data conversion apparatus 10 to the MFP 92 via a USB flash drive, and imported by the MFP 92 as information such as the address book, the user list, the department list, and the apparatus setting information of the MFP 92.

As described above, the data conversion program 14a once converts the pre-conversion type-format data into the common-format data (S101) and then converts the common-format data into the post-conversion type-format data (S103). Accordingly, the type-format data can be converted in accordance with a change in the MFP model.

The conversion rule information 14b and the conversion rule information 14c include the rule for correlating the order in the series of the type-format values in the type-format data and the common-format items. This allows the data conversion program 14a to convert the type-format data, where the type-format items are expressed in accordance with the order in the series of the type-format values, in accordance with the change in the MFP model.

The conversion rule information 14b and the conversion rule information 14c include the rules for correlating the type-format values with the common-format values. Accordingly, this allows the data conversion program 14a to convert the type-format data in accordance with the change in the MFP model even if the same type-format value has different meanings depending on the type-format data (YES at S131, YES at S162).

The conversion rule information 14c includes the rules for correlating the common-format values with the null value type-format values. Accordingly, this allows the data conversion program 14a to generate the post-conversion type-format data where the type-format items are related with the null value type-format values even if the type-format item not present in the pre-conversion type-format data is present in the post-conversion type-format data (YES at S165).

The conversion rule information 14c includes the rule for correlating the order in the series of the type-format values in the type-format data and the type-format items. This allows the data conversion program 14a to generate the post-conversion type-format data including information where the type-format items themselves are arrayed in the order in the series of the type-format values in the type-format data.

The data conversion program 14a edits the common-format data of format independent of the MFP model (S102). Accordingly, compared with the case of editing the type-format data of format dependent on the MFP model, data can be edited with simple configuration independent of the model.

This embodiment describes an example where the type-format data illustrated in FIG. 3 is converted into the type-format data illustrated in FIG. 4. However, the type-format data illustrated in FIG. 4 can be converted into the type-format data illustrated in FIG. 3 in a similar manner. Type-format data for a model other than the above-described model can support such conversion simply by preparing the corresponding conversion rule information.

While the image forming apparatus of this disclosure is an MFP in this embodiment, the image forming apparatus may be an image forming apparatus other than the MFP such as a print-only machine, a copy-only machine, or a FAX only machine.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-transitory computer-readable recording medium storing a data conversion program configured to convert pre-conversion type-format data for a first model of image forming apparatus into post-conversion type-format data for a second model of image forming apparatus, the data conversion program causing a computer to function as:

a common-format conversion unit configured to convert the pre-conversion type-format data into, as an extensible markup language (XML) definition file, common-format data of format independent of image-forming-apparatus model, based on pre-conversion-data conversion rule information indicating rules for converting between the pre-conversion type-format data and the common-format data, the pre-conversion-data conversion rule information being an XML file, and the common-format data including common-format values expressed as content sandwiched between start tags and end tags, the common-format values belonging to common-format items expressed as elements in tags; and a type-format conversion unit configured to convert the common-format data generated by the common-format conversion unit into the post-conversion type-format data, based on post-conversion-data conversion rule information indicating rules for converting between the post-conversion type-format data and the common format data, the post-conversion-data conversion rule information being an XML definition file; wherein the pre-conversion type-format data and the post-conversion type-format data are data in which type-format items are expressed according to a serial ordering of type-format values belonging to the type-format items, and are binary data uniquely processed by compressing comma-separated values (CSV) format data and adding to the compressed CSV format data information including model information, apparatus setting information, and, as data type information, at least one of an address book, a user list, and a department list;

the pre-conversion-data conversion rule information and the post-conversion-data conversion rule information include rules for correlating the type-format items with the common-format items, and rules for correlating the type-format values with the common-format values;

the post-conversion-data conversion rule information further includes rules for correlating the type-format items with order in the series of type-format values, and rules for correlating the common-format items with null-value type-format values that are set as the type-format value in cases where the common-format value in the common-format data is a null value when the common-format data is converted into the post-conversion type-format data; and the common-format conversion unit is further configured to convert the pre-conversion type-format data into the common-format data by writing type-format values belonging to type-format items in the pre-conversion type-format data as common-format values belonging to common-format items correlating, in the pre-conversion-data conversion rule information, with the type-format items in the pre-conversion type-format data, and writing as null values common-format values belonging to common-format items other than the common-format items correlating, in the pre-conversion-data conversion rule information, with the type-format items in the pre-conversion type-format data, convert the common-format data into the post-conversion type-format data by writing common-format values belonging to type-format items in the common-format data as type-format values belonging to type-format items correlating, in the post-conversion-data conversion rule information, with the common-format items in the common-format data, when common-format values correlate, in the pre-conversion-data conversion rule information, with type-format values, convert the pre-conversion type-format data into common-format data by writing the common-format values correlating with the type-format values as common-format values of the common-format items correlating, in the pre-conversion-data conversion rule information, with the type-format items to which the type-format values belong, when type-format values correlate, in the post-conversion-data conversion rule information, with common-format values, convert the common-format data into post-conversion type-format data by writing the type-format values correlating with the common-format values as type-format values of the type-format items correlating, in the post-conversion-data conversion rule information, with the common-format items to which the common-format values belong, when common-format values are null values, convert the common-format data into post-conversion type-format data by writing null-value type-format values correlating with the common-format items to which the common-format values belong, as the type-format values of the type-format items correlating, in the post-conversion-data conversion rule information, with the common-format items, and when converting the common-format data into the post-conversion type-format data, to incorporate into the post-conversion type-format data information arranging the type-format items according to the type-format values' serial ordering.

2. The non-transitory computer-readable recording medium according to claim 1, further causing the computer to function as a data editing unit configured to edit the common-format data.

3. A data conversion method for converting pre-conversion type-format data for a first model of image forming apparatus into post-conversion type-format data for a second model of image forming apparatus, the data conversion method comprising:

converting the pre-conversion type-format data into, as an extensible markup language (XML) definition file, common-format data of format independent of image-forming-apparatus model, based on pre-conversion-data conversion rule information indicating rules for converting between the pre-conversion type-format data and the common-format data, the pre-conversion-data conversion rule information being an XML file, and the common-format data including common-format values expressed as content sandwiched between start tags and end tags, the common-format values belonging to common-format items expressed as elements in tags;

converting the common-format data into the post-conversion type-format data, based on post-conversion-data conversion rule information indicating rules for converting between the post-conversion type-format data and the common format data, the post-conversion-data conversion rule information being an XML definition file; wherein the pre-conversion type-format data and the post-conversion type-format data are data in which type-format items are expressed according to a serial ordering of type-format values belonging to the type-format items, and are binary data uniquely processed by compressing comma-separated values (CSV) format data and adding to the compressed CSV format data information including model information, apparatus setting information, and, as data type information, at least one of an address book, a user list, and a department list;

the pre-conversion-data conversion rule information and the post-conversion-data conversion rule information include rules for correlating the type-format items with the common-format items, and rules for correlating the type-format values with the common-format values;

the post-conversion-data conversion rule information further includes rules for correlating the type-format items with order in the series of type-format values, and rules for correlating the common-format items with null-value type-format values that are set as the type-format value in cases where the common-format value in the common-format data is a null value when the common-format data is converted into the post-conversion type-format data;

the converting the pre-conversion type-format data into the common-format data further includes
   writing type-format values belonging to type-format items in the pre-conversion type-format data as common-format values belonging to common-format items correlating, in the pre-conversion-data conversion rule information, with the type-format items in the pre-conversion type-format data, and
   writing as null values common-format values belonging to common-format items other than the common-format items correlating, in the pre-conversion-data conversion rule information, with the type-format items in the pre-conversion type-format data;

the converting the common-format data into the post-conversion type-format data further includes writing common-format values belonging to type-format items in the common-format data as type-format values belonging to type-format items correlating, in the post-conversion-data conversion rule information, with the common-format items in the common-format data;

when common-format values correlate, in the pre-conversion-data conversion rule information, with type-format values, the converting the pre-conversion type-format data into common-format data further includes writing the common-format values correlating with the type-format values as common-format values of the common-format items correlating, in the pre-conversion-data conversion rule information, with the type-format items to which the type-format values belong;

when type-format values correlate, in the post-conversion-data conversion rule information, with common-format values, the converting the common-format data into post-conversion type-format data further includes writing the type-format values correlating with the common-format values as type-format values of the type-format items correlating, in the post-conversion-data conversion rule information, with the common-format items to which the common-format values belong; and when common-format values are null values, the converting the common-format data into post-conversion type-format data further includes writing null-value type-format values correlating with the common-format items to which the common-format values belong, as the type-format values of the type-format items correlating, in the post-conversion-data conversion rule information, with the common-format items, and incorporating into the post-conversion type-format data information arranging the type-format items according to the type-format values' serial ordering.

4. The data conversion method according to claim 3, further comprising editing the common-format data.

5. A data conversion apparatus for converting pre-conversion type-format data for a first model of image forming apparatus into post-conversion type-format data for a second model of image forming apparatus, the apparatus comprising:
   a common-format conversion unit configured to convert the pre-conversion type-format data into, as an extensible markup language (XML) definition file, common-format data of format independent of image-forming-apparatus model, based on pre-conversion-data conversion rule information indicating rules for converting between the pre-conversion type-format data and the common-format data, the pre-conversion-data conversion rule information being an XML file, and the common-format data including common-format values expressed as content sandwiched between start tags and end tags, the common-format values belonging to common-format items expressed as elements in tags; and
   a type-format conversion unit configured to convert the common-format data generated by the common-format conversion unit into the post-conversion type-format data, based on post-conversion-data conversion rule information indicating rules for converting between the post-conversion type-format data and the common format data, the post-conversion-data conversion rule information being an XML definition file; wherein the pre-conversion type-format data and the post-conversion type-format data are data in which type-format items are expressed according to a serial ordering of type-format values belonging to the type-format items, and are binary data uniquely processed by compressing comma-separated values (CSV) format data and adding to the compressed CSV format data information including model information, apparatus setting information, and, as data type information, at least one of an address book, a user list, and a department list;

the pre-conversion-data conversion rule information and the post-conversion-data conversion rule information include rules for correlating the type-format items with the common-format items, and rules for correlating the type-format values with the common-format values;

the post-conversion-data conversion rule information further includes rules for correlating the type-format items with order in the series of type-format values, and rules for correlating the common-format items with null-value type-format values that are set as the type-format value in cases where the common-format value in the common-format data is a null value when the common-format data is converted into the post-conversion type-format data; and the common-format conversion unit is further configured to
   convert the pre-conversion type-format data into the common-format data by
      writing type-format values belonging to type-format items in the pre-conversion type-format data as common-format values belonging to common-format items correlating, in the pre-conversion-data conversion rule information, with the type-format items in the pre-conversion type-format data, and
      writing as null values common-format values belonging to common-format items other than the common-format items correlating, in the pre-conversion-data conversion rule information, with the type-format items in the pre-conversion type-format data,
   convert the common-format data into the post-conversion type-format data by writing common-format values belonging to type-format items in the common-format data as type-format values belonging to type-format items correlating, in the post-conversion-data conversion rule information, with the common-format items in the common-format data,
   when common-format values correlate, in the pre-conversion-data conversion rule information, with type-format values, convert the pre-conversion type-format data into common-format data by writing the common-format values correlating with the type-format values as common-format values of the common-format items correlating, in the pre-conversion-data conversion rule information, with the type-format items to which the type-format values belong, when type-format values correlate, in the post-conversion-data conversion rule information, with common-format values, convert the common-format data into post-conversion type-format data by writing the type-format values correlating with the common-format values as type-format values of the type-format items correlating, in the post-conversion-data conversion rule information, with the common-format items to which the common-format values belong, when common-format values are null values, convert the common-format data into post-conversion type-format data by writing null-value type-format values correlating with the common-format items to which the common-format values belong, as the type-format values of the type-format items correlating, in the post-conversion-data conversion rule information, with the common-format items, and when converting the common-format data into the post-conversion type-format data, to incorporate into the post-conversion type-format data information arranging the type-format items according to the type-format values' serial ordering.

\* \* \* \* \*